United States Patent Office 3,432,381
Patented Mar. 11, 1969

3,432,381
THERMAL INSULATION OF FIBROUS BRUCITE
John Oliver Collins, Jr., Martinsville, N.J., assignor to Johns-Manville Corporation, New York, N.Y., a corporation of New York
No Drawing. Continuation-in-part of application Ser. No. 266,813, Mar. 21, 1963. This application Aug. 19, 1966, Ser. No. 573,493
U.S. Cl. 162—152          5 Claims
Int. Cl. C04b 43/04

ABSTRACT OF THE DISCLOSURE

An ablative type thermal insulation for transient thermal conditions comprising fibrous brucite and thermosetting resin.

---

This application comprises a continuation-in-part application of my copending U.S. patent application, Ser. No. 266,813, filed Mar. 21, 1963, and now abandoned.

This invention relates to novel means of insulating thermal energy, and to new and improved thermal insulating products. More particularly, the invention comprises a new use of specific material to effect a variety of enhanced and unique thermal insulating products which provide marked improvements and new results over prior practices.

Current technological advances in the aircraft and missile and other fields, and the aggressive conditions encountered therein, present continuing needs for thermal insulsating materials or products of greater efficiency and effectiveness in more demanding and rigorous environments. The ensuing developments in this area have led to many new concepts, applications and materials in the thermal insulating field such as ablative type insulations and heat sink insulating bodies. The ablative type thermal insulation typically comprises an expandable, relatively dense body of reinforced resin which performs its insulating function by expending and/or absorbing thermal energy in the melting, vaporizing, depolymerizing or other endothermic chemical action involved in the consumption of exposed surfaces of the resin mass. These ablative type resinous bodies are normally strengthened or reinforced with fibrous material in the form of discrete fibers, felted bodies of various densities including paper, etc., of compositions which resist the rigors of the temperatures, shock, and stresses of exposure and impart useful thermal properties. Such fibrous materials include carbon and in particular graphite fibers or cloth, zirconia, titania, alumina and the like uncommon and costly fibrous material or articles thereof. The heat sink type of insulation or system employs materials having a high specific heat or the capacity to absorb and retain appreciable quantities of thermal energy while maintaining their integrity.

It is a primary object of this invention to provide an effective means of insulating thermal energy comprising the novel utilization of an economical fibrous mineral material having a good thermal insulating capacity or low conductivity, and in particular superior ablative insulating properties and is of exceptional adaptability and properties for rigorous thermal insulation applications or aggressive conditions.

It is also a primary object of this invention to provide a fibrous inorganic material for the fabrication of thermal insulating products which by virtue of its inherent composition and characteristics is effective at high temperatures, maintaining its integrity, and possesses a high specific heat or capacity for the absorption of thermal energy, a superior diffusivity over materials of comparable density and good thermal conductivities over an extended range of temperature conditions.

It is a further object of this invention to provide a fibrous inorganic material which may be formed or felted into a variety of insulations or components for insulating products, and possesses good resistance to relatively high temperatures, has a high fusion point and in turn is thermally stable exhibiting no discernable shrinkage or density increase throughout an appreciable temperature range up to about 2500° F.

It is a further object of this invention to provide an inorganic fibrous material which readily lends itself to both wet and dry forming or felting techniques, and the formation of handleable, low felted bodies of good strength to weight ratios and the like physical properties with little or no binder, including felts of densities ranging upwards from about 3 lbs./cu. ft., papers, boards, webs and the like conventional constructions for insulating products, as well as simply fibrous reinforcement in ablative type thermal insulations.

It is a further object of this invention to provide means of forming novel inorganic fibrous reinforcement or components of discrete fibers, felts, webs, paper, etc. of high liquid saturant or impregnant capacities for saturating, laminating or embedding within a matrix or body and thereby providing reinforced plastic bodies of low erosion and mass ablation rates.

These and other objects and advantages of this invention will become more apparent from the hereinafter detailed description thereof.

Broadly, this invention comprises the use or application of fibrous brucite in thermal insulation applications. More aptly this invention can be said to comprise the discovery and appreciation of certain latent inherent and potential physical and chemical properties of fibrous brucite and in turn its unique unexpected capacity to more effectively satisfy and fulfill the basic needs or requirements of many rigorous and demanding thermal insulation applications. Further, this invention also comprises the adaptation of fibrous brucite to useful forms or constructions for thermal insulation employment and their utilization in combination with or incorporated within thermal insulating products.

The basic component of this invention comprises the fibrous form of the mineral brucite, also known or identified as nemalite or nematolite, a composition composed of greater than about 85% by weight of $Mg(OH)_2$ which is found in North America and other locations throughout the world. Typical chemical compostions for fibrous brucite materials from the Quebec, Canada area, as determined by independent research institutions over a period of some years, were as follows:

| Composition | Year 1932 | Year 1961 |
|---|---|---|
| $SiO_2$ | | 1.85 |
| $Fe_2O_3$ | 1.95 | 1.55 |
| FeO | 9.57 | 9.30 |
| MgO | 60.33 | 59.87 |
| $H_2O$ | 28.60 | 27.90 |
| | 100.45 | 100.47 |

[1] The MgO and $H_2O$ actually occur as component parts of the $Mg(OH)$ structure but have been reported separately in these analyses.

Brucite and its fibrous phase or nemalite can be further identified and its characteristics described in mineralogical texts, for example, Dana, The System of Mineralogy.

Particularly significant and useful properties of fibrous brucite are the high specific heat of $Mg(OH)_2$ (0.31 B.t.u./lb. ° F. at 300° F.), the conversion or dehydration of its original $Mg(OH)_2$ content to MgO upon exposure to temperatures of above about 800° F. and the high melting point of the resultant MgO of about 5070° F. The thermal dehydration or conversion of $Mg(OH)_2$ to MgO is a time-temperature function and at a temperature of about 1000° F. dehydration can be completed in the period of approximately 1½ hours, as determined by X-ray analysis, while higher temperatures effect the conversion in shorter periods and lower temperatures of down to about 800° F. require considerably greater periods of time. The substantially complete dehydration of fibrous brucite or conversion of its $Mg(OH)_2$ content to MgO results in a loss in weight of approximately 28%, which loss comprises an advantageous property when the material is employed as an insulation subjected to steady state thermal conditions as the total weight of the insulation, or the fibrous brucite component thereof, is reduced by almost one-third during use. The high specific heat of the initial $Mg(OH)_2$ and the approximately 2500 B.t.u./lb. absorbed in the conversion of $Mg(OH)_2$ to MgO provides a body of a superior diffusivity under transient conditions over felts composed of conventional fibrous compositions of equivalent densities and thermal conductivities.

Typical mineral samples of brucite contain about 8 to 12% by weight of FeO as a major impurity which upon exposure to elevated temperatures oxidizes to $Fe_2O_3$. This oxidation is also a function of time vs. temperature. The presence of the $Fe_2O_3$ oxidation products results, of course, in a small reduction in the melting point of the MgO fibers to about 4700° F. as is shown by published $MgO-Fe_2O_3$ phase diagrams.

The thermal conversion of the $Mg(OH)_2$ component of the brucite material to MgO can be effected prior to the construction of or application in an insulation product or insulating installation, or subsequent thereto. However as is apparent, the high specific heat of the initial $Mg(OH)_2$ and the relatively large quantity of thermal energy and material weight expended in its dehydration to MgO comprises a decided advantage in many insulating applications, particularly those encountering transient conditions. Moreover, the greater strength and in turn handleability of the original fiber form substantially contributes to the advantages of forming or fabricating the insulation or installation with the natural fiber and subsequently effecting their dehydration. In either case, the resulting dehydrated body of MgO fiber in the form of low density insulating felts exhibits good thermal properties, i.e., a dehydrated brucite felt of MgO fiber of approximately 4 lbs./cu. ft. density exhibits thermal conductivities of about 0.88 and about 1.11 B.t.u./in./hr./ft.$^2$/° F. at 800° F. and 1000° F. respectively.

Crude fibrous brucite or nemalite comprises a mass of tightly bonded fiber bundles which can be separated and opened by mechanical milling techniques. Although the fiber bundles can be mechanically opened to a high degree, unlike asbestos fiber they cannot be separated to their basic fiber structure by means of the process of U.S. Letters Patent No. 2,626,213. Suitable means of opening the tightly adhering bundles of brucite fibers comprise crush rolling or hammer milling, or the bundles of crude can be effectively reduced to usable form by stapling the fiber to a length of approximately ⅛ to ½ inch and passing the stapled crude through an impact mill such as is common to asbestos fiber processing procedures, for example an Entoleter centrifugal impact mill, hammer mill, willow, attrition mill, etc.

A particularly effective technique of processing or preparing and handling the mineral brucite material has been found to consist of stapling the crude fiber bundles to about ¼ to ⅜ inch in length on a Taylor-Stiles cutter which reduces a large percentage of the crude to an apt length and in turn incites a cleavage action whereby the resulting "pencils" or bundles have a length to width ratio of approximately 10–100:1. This material is then passed over a 3 mesh screen and the minus 3 fraction run through an Entoleter, Inc. centrifugal impact mill rotating at a speed of about 4200 r.p.m. thereby increasing the length to width ratio to about 500–1000:1 and pulverizing any rock, etc. carried along. The fibrous crude resulting from these measures was found to be in a suitable condition for felting, or further cleaning if a highly refined product is required or the crude is particularly contaminated. Brucite fiber thus treated exhibited a McNett screen analysis and surface area of:

McNett analysis (surface area 5500 cm.$^2$/gm.)

| Mesh: | Percent |
|---|---|
| +4 | 3.1 |
| +14 | 14.2 |
| +35 | 20.7 |
| +200 | 31.5 |
| −200 | 30.5 |

Further refining or cleaning can be accomplished by aeration, settling out of the rock or heavy fractions, centrifugal action, and the like common techniques. Felted bodies of brucite fibers can be formed by means of either wet or dry felting techniques with the latter means resulting in a somewhat lower density product ranging down to about 3 lbs./cu. ft. Wet or water deposited felts can be produced in the form of papers, thin mats, or low density felts on typical papermaking or felting apparatus. Dry felting, as is common, can be effected by depositing a loose mass or air suspension of fibers on a bed, frequently facilitated by the application of a vacuum or subatmospheric pressure to the underside of the felting bed means.

Fibrous masses of brucite fibers refined as above and in the form of typical low density insulating bodies or products of about 3.5 to 4 lbs./cu. ft. and up, surprisingly are resistant to temperatures running up to about 2500° F. and maintain their soft fibrous nature with no evidence of sintering or fusion. Refractory alumina-silica and silica fibers or felts thereof currently commonly employed in many high temperature insulating applications show considerable shrinkage and embrittlement at 2500° F., and felts of stabilized zirconia in the 11 to 12 p.c.f. range undergo an approximately 25% increase in density at this temperature with definite signs of sintering. However, at 3200° F. the fibrous brucite or resulting magnesia fiber felts increase in density by a factor of about 5, but zirconia felts when subjected to like thermal conditions increased in density by a factor of about 15.

Typical commercially available high refractory fibers, such as calcia stabilized zirconia being polycrystalline in structure are usually very brittle and fragile and the felts thereof are consequently difficult if not impossible to handle in thin sections. Fibrous brucite on the other hand, unexpectedly comprises a relatively tough fiber and with relatively small amounts of binder of only about 3 to 5% by weight, produces a strong felt in all thicknesses which can be handled, cut, fabricated, shaped or installed with little concern or likelihood of damage. Moreover, papers formed of refined fibrous brucite containing only minor proportions of binder of for example about 3 to 5% by weight are handleable and can be saturated with high ratios of resin employing typical saturating techniques whereas the best zirconia fiber requires between 10 and 25% by weight of asbestos or other fiber as a carrier due to its fragile nature.

Brucite fiber, crush rolled to open the tightly adhering bundles and stapled to about ¼ to ½ inch in length, was vigorously agitated from 20 to 30 minutes in 1 to 2% solids content aqueous slurry with 5% by weight of the fibers, of acrylic resin (Rohm & Haas Co.'s Rhoplex HA–16), then wet felted by filtering the slurry and drying the consolidated fibrous masses. This produces fibrous bodies of about 4.7 p.c.f. density. When exposed for a period of 2 hours to temperatures of 1000° F., 1500° F., 2000° F., and 2500° F., samples of these felts exhibited a progressively increasing weight loss and after an extended period of 6 hours at 3200° F. the total weight loss was reckoned at 32% which corresponds closely with the theoretical loss of water which takes place in the conversion or dehydration of $Mg(OH)_2$ to $MgO$, also taking into consideration the slight weight gain resulting from the oxidation of $FeO$ to $Fe_2O_3$. The dimensions of these felt samples remained essentially unchanged throughout the exposures to 2500° F., but some shrinkage was observed after the 3200° F. exposure. Moreover, these felts retained their soft, fragile nature through 2500° F. becoming somewhat brittle after 3200° F., although their fibrous nature was fully maintained.

Samples of these felts having a density of 4.6 p.c.f. and measuring 12 inches x 12 inches x ⅞ inch were fired for 4 hours at 1500° F. to convert the $Mg(OH)_2$ of the fibrous brucite mineral to $MgO$ and then evaluated in a heat meter conductivity apparatus at 800° F. and 1000° F. The fired samples, as tested, had a density of 3.7 p.c.f. as a result of the conversion of the magnesium hydroxide of the brucite to magnesia and the application of slight compression to the felts to obtain parallel faces. The densities and resulting thermal conductivities of the magnesia fiber felt and of commercial high refractory alumina-silica felts of like construction employed as a standard, were:

|  | Fibrous magnesia felt | Alumina-silica fiber felt | |
|---|---|---|---|
| Density, p.c.f. | 3.7 | 3.0 | 4.0 |
| Conductivity, B.t.u., in./hr. ft.² ° F. at: | | | |
| 800° F. mean | 0.88 | 0.93 | 0.82 |
| 1000° F. mean | 1.11 | 1.25 | 1.07 |

The magnesia felt accordingly exhibited substantially equivalent thermal conductivities to those of commercial alumina-silica felts currently commonly employed in aircraft and other high temperature applications.

Brucite fiber, prepared or refined as described above, was dispersed with 3% by weight thereof of acrylic resin (Rhoplex HA–16) in an aqueous slurry and paper sheets formed therefrom in 10 to 12 mil thicknesses and of weight of about 3 lbs./100 ft.². The binder retention or content of the resulting papers was about 1.5 to 2% by weight of the fibrous material. Samples of the papers were saturated with a phenolic resin and laminated to provide an ablative type thermal insulation. These papers exhibited an unexpectedly high resin pick-up of up to approximately 50% and averaged about 44% by weight thereof of resin, and adequate strength for normal saturation and handling.

Cured resin laminates, comprising phenolic resin saturated fibrous brucite paper sheets, were evaluated and compared with comparable standards of currently commercial ablative type phenolic resin laminates of like construction and composition but comprising asbestos paper and other fibrous reinforcing materials in place of brucite by subjecting each to an oxyacetylene torch test. The brucite paper reinforced laminate contained approximately 44% by weight of phenolic resin and the asbestos paper and each of the other reinforced laminates contained approximately 40% by weight of the phenolic resin. All samples were prepared by consolidating the laminates at 300 p.s.i. and 300° F. for 1 hour followed by a post cure of 16 hours at 300° F. In each case the particular sample was placed in a standard sample holder positioning the surface of the sample at a distance of 1½ inches from the torch, and the oxygen and acetylene pressure gauges were set at 40 p.s.i. and 10 p.s.i., respectively. The time-temperature relationship on the cold face was obtained by means of a thermocouple in contact with the cold face and recorded automatically. The thermocouple was removed when the cold face temperature reached 400° F. Each test was continued until burn-through or until 90 seconds had elapsed, whichever was sooner. The brucite containing laminates did not burn through in the 90 seconds period, but surprisingly required 104 seconds for the backside of the sample to reach 400° F. and 232 seconds for the flame to penetrate through the sample. Hence a thickness measurement at the deepest point of the crater formed after a standard 90 second period had to be made for the brucite samples. Of the two conventional asbestos paper laminates tested one was run until burn-through which happened to coincide with the 90 second time limit, while the other was run for only 60 seconds as a means of determining the effect of burn-through versus partial burn-through on the calculated erosion rate.

Observation of the specimens during testing showed that the asbestos paper laminates eroded away in waves traveling radially outwards and it appeared as though the molten globules of reinforcement created the pattern. In contrast thereto the fibrous brucite paper reinforced laminate showed no movement until the charred layer apparently became so brittle that the force of the torch fragmented the char and blew it completely away from the impingement area. These small particles of char, however, appeared to be dislodged at a relatively slow rate in comparison with the almost continuous movement of the asbestos globules. The calculation of the erosion rate of the two asbestos paper laminates gave two widely variant values of 2.82 and 1.35 mils/sec. for complete burn-through and partial burn-through respectively whereby there appears to be considerable change in the calculated erosion rate as the erosion progresses through the sample. This is as would be expected since in the initial stages of erosion the laminate undoubtedly functions as a heat sink dissipating heat from the torch. However, as the non-eroded portion of the sample becomes smaller in relation to its original thickness its heat absorbing capabilities become less and a greater portion of the incident heat enters the ablation and erosion process. Hence, the longer the test the higher the calculated erosion rate. The relative erosion rates and insulation indexes of the fibrous brucite and asbestos paper samples along with a number of other high temperature cloth or paper reinforced laminates, when subjected to the oxy-acetylene torch test under identical conditions as set forth in Table I.

TABLE I.—EROSION RATE AND INSULATION INDEX OF BRUCITE AND OTHER REINFORCED LAMINATES

| Reinforcement material, with approximately 40% of phenolic resin | Erosion rate, mils/sec. | | Insulations index, mils/sec. |
|---|---|---|---|
| | 90 second time limit or burn-through | 60 second time limit partial burn-through | |
| 100% brucite | 1.75 | 0.83 | 2.88 |
| Asbestos paper | 2.82 | | 3.43 |
| Do | | 1.35 | |
| Carbon cloth | 1.18 | | 6.00 |
| Tungsten paper with nylon [1] | 1.75 | | 2.48 |
| Asbestos paper with nylon [1] | 2.16 | | 2.43 |
| 79% asbestos, 20% nylon [1] flock | 2.44 | | 2.88 |
| 48% asbestos, 48% graphite fiber | 2.48 | | 4.37 |
| 68% asbestos, 28% graphite flake | 2.60 | | 3.73 |
| 67% asbestos, 30% silica fiber | 2.74 | | 3.31 |

[1] Du Pont's polyamide resin fiber.

A series of high temperature tests comprising a relative evaluation of the ablative properties of resin laminates reinforced with brucite paper and assorted papers of fibrous materials of conventional compositions were carried out with a 40 KW plasms arc torch. All reinforcements were laminated with Monsanto Chemical Co.'s SC–1008 phenolic resin. The laminate samples were cut to 2 inches x 2 inches x ½ inch test pieces. Each sample was tested with a 40 KW Giannini Model L–40 plasmatron powered by four selenium rectifiers and the following typical conditions were employed in carrying out these tests:

Heat flux _____ B.t.u./ft.²-sec__ 400
Gas enthalpy _____ B.t.u./lb. (average) __ 2695
Flame temperature _____ ° F. (average) __ 6035
Test distance _____ inch__ 1⅛
Test angle _____ deg__ 45
Gas velocity _____ ft./sec.__ 1065

Test atmosphere:
N₂ ---percent-- 80
O₂ ---do---- 20

The test samples were exposed for 60 seconds and/or 90 seconds. The fibrous brucite paper reinforced phenolic laminates were found to exhibit the best ablation properties of all materials tested and were superior to both carbon cloth and graphite cloth reinforced laminates. The brucite fiber reinforced laminate sample exposed to the plasma arc torch for 90 seconds gave an erosion rate of 1.76 mils/sec., a mass ablation rate of 0.0145 lb./ft.²/sec., an effective heat capacity of 27,600 B.t.u./lb. and a cold face temperature rise of only 101° F. The highly effective but very costly carbon cloth reinforced phenolic laminates rated second with an erosion rate of 2.72 mils/sec., a mass ablation rate of 0.0189 lb./ft.²-sec., effective heat capacity of 21,200 B.t.u./lb., and a cold face temperature rise of 340° F. after 90 seconds. The brucite reinforced samples eroded very slowly while exposed to the torch giving off very small particles, and the erosion occurred in a layer by layer manner leaving the base laminate intact. The composition of the reinforced laminates tested and their respective ablation properties are set forth in preceding Table II.

A further plasma arc torch test employing test samples of somewhat different compositions and the given similar test conditions produced the data of Table III. The data of this table represent an average of the results of five composition samples. The average test conditions were:

Heat flux ---B.t.u./ft.²-sec-- 400
Gas enthalpy ---B.t.u./lb. (average)-- 2715
Flame temperature ---° F. (average)-- 6060
Test distance ---inch-- 1⅛
Test angle ---deg-- 45
Gas velocity ---ft./sec-- 1050
Test atmosphere
N₂ ---percent-- 80
O₂ ---do---- 20

A number of papers comprising fibrous brucite and various binder systems were formed on a cylinder paper making machine. The binders included acrylic resins, acetate resins, acrylic rubbers, urea formaldehyde resins, vinyl alcohol, carboxymethylcellulose and corn gum. Alum (aluminum sulfate) was employed with some binders to enhance their retention. The fiber and the particular respective binder was dispersed and mixed in a chest of the paper making machine and subsequently sheeted out into the paper product. The composition and properties of exemplary papers are set forth in Table IV.

TABLE II.—ABLATION TEST DATA

| Sample | Reinforcement description | Resin (percent) | Sp, gr. | 60 second exposure time (avg. of 2 samples or single sample) | | | | | 90 second exposure time (one sample) | | | | |
|---|---|---|---|---|---|---|---|---|---|---|---|---|---|
| | | | | Erosion rate | | Mass ablat. rate (lb./ft.²-sec.) | Eff. heat cap. (B.t.u./lb.) | Cold face temp rise (° F.) | Erosion rate | | Mass ablat. rate (lb./ft.²-sec.) | Eff. heat cap. (B.t.u./lb.) | Cold face temp rise (° F.) |
| | | | | Mils/sec. | Gm./sec. | | | | Mils/sec. | Gm./sec. | | | |
| A | Brucite fiber paper | 46 | 1.58 | 1.67 | 0.123 | 0.0137 | 29,200 | 68 | 1.76 | 0.115 | 0.0145 | 27,600 | 101 |
| B | Carbon cloth | 50 | 1.33 | 2.83 | 0.303 | 0.0196 | 20,400 | 208 | 2.73 | 0.273 | 0.0189 | 21,200 | 340 |
| C | do | 40 | 1.28 | 3.03 | 0.245 | 0.0202 | 19,700 | 673 | 2.92 | 0.206 | 0.0194 | 20,600 | 1888 |
| D | Graphite cloth | 48 | 1.29 | 3.06 | 0.235 | 0.0206 | 19,500 | 790 | 3.10 | 0.209 | 0.0208 | 19,200 | 1603 |
| E | 75% zirconia fiber-asbestos paper | 41 | 1.96 | 2.07 | 0.163 | 0.0211 | 19,000 | 38 | 2.04 | 0.153 | 0.0208 | 19,200 | 27 |
| F | 50% graphite fiber-asbestos paper | 46 | 1.49 | 3.33 | 0.287 | 0.0258 | 15,500 | 67 | 3.42 | 0.283 | 0.0264 | 15,200 | 115 |
| G | 50% chopped textile graphite fiber-asbestos paper | 50 | 1.40 | 3.68 | 0.291 | 0.0268 | 14,900 | 63 | 3.62 | 9.283 | 0.0264 | 15,200 | 112 |
| H | 75% carbon fiber-asbestos paper | 44 | 0.86 | 6.33 | 0.259 | 0.0339 | 11,800 | 968 | 5.86 | 0.228 | 0.0314 | 12,700 | 1992 |
| I | 50% carbon fiber-asbestos paper | 44 | 1.18 | 5.73 | 0.349 | 0.0351 | 11,400 | 88 | 5.74 | 0.314 | 0.0352 | 11,400 | 845 |
| J | 75% zirconia fiber-asbestos paper | 39 | 1.94 | 4.15 | 0.213 | 0.0418 | 9,600 | 44 | 3.72 | 0.191 | 0.0373 | 10,700 | 58 |
| K | 50% zirconia fiber-asbestos paper | 42 | 1.85 | 4.77 | 0.320 | 0.0458 | 8,700 | 13 | 4.37 | 0.229 | 0.0420 | 9,500 | 81 |

TABLE IV

| | Sample compositions in percent by weight | | | | |
|---|---|---|---|---|---|
| | A | B | C | D | E |
| Furnish: | | | | | |
| Fibrous brucite | 97 | 95 | 94 | 94 | 32 |
| Acrylic resin (Rohm & Haas RHOPLEX HA-16) | 3 | | 3 | 3 | 1 |
| Carboxymethylcellulose (Hercules CMC-70H) | | 5 | 3 | | 2 |
| Corn gum (Stayco G) | | | | 3 | 1 |
| Alum (aluminum sulfate) | | 6 | | 6 | 2 |
| Fibrous brucite paper scrap | | | | | 62 |
| Physical Properties: | | | | | |
| Basis weight, lb./100 ft.² | 2.3 | 3.4 | 3.0 | 4.2 | 2.5 |
| Caliper mils | 10 | 11 | 10 | 14 | 9 |
| Bulk, percent | 0.43 | 0.32 | 0.34 | 0.32 | 0.36 |
| Mullen, p.s.i. | 11 | 1 | 2 | 5 | 2 |
| Tensile, lb./in. (MD) | 8.1 | 4.5 | 5.5 | 10.9 | 6.4 |
| Tensile, lb./in. (CD) | 6.1 | 2.7 | 4.1 | 8.2 | 3.7 |
| Stretch, Percent (MD) | 2.1 | 0.2 | 0.2 | 0.4 | 0.2 |
| Stretch, percent (CD) | 2.8 | 0.2 | 0.2 | 0.3 | 0.2 |
| Wet (water) tensile, lb./in. (MD) | 2.6 | 0.5 | 2.3 | 4.5 | 1.7 |
| Wet (methylethyl ketone) tensile, lb./in. (MD) | 2.0 | 2.7 | 3.9 | 7.1 | 4.3 |
| Hot wet tensile, p.s.i. (MD) | 100 | 187 | 330 | 241 | 193 |
| Tear, grams (MD) | 45 | 19 | 22 | 32 | 15 |
| Tear, grams (CD) | 51 | 28 | 24 | 52 | 17 |
| Stiffness, grams (MD) | | 1.1 | 1.0 | 2.3 | 0.7 |
| Stiffness, grams (CD) | 1.0 | 0.6 | 2.1 | 0.4 | |
| Kerosene value, percent | 110 | 100 | 83 | 84 | 101 |
| Densometer, sec./100 cc | 67 | 7 | 42 | 37 | 19 |
| Ash, percent | | 72.5 | 72.8 | 72.3 | 72.4 |
| Organic, percent | 3.0 | 1.9 | 7.5 | | |
| Ash in fiber, percent | | 74.0 | | | |

NOTE.—MD denotes machine direction or parallel to the web formation and CD cross machine direction or perpendicular to web formation.

TABLE III.—ABLATION TEST DATA
[Heat flux, 400 B.t.u./ft.²-sec., 90 second exposure time]

| Sample | Reinforcement description | Resin (percent) | Specific gravity | Erosion rate | | Mass ablat. rate (lb./ft.²-sec.) | Eff. heat cap/ (B.t.u./lb.) |
|---|---|---|---|---|---|---|---|
| | | | | Mils/sec. | Grams/sec. | | |
| A | Brucite fiber-phenolic shredded molding compound | 40 | 1.59 | 1.08 | 0.091 | 0.0089 | 44,800 |
| B | Brucite fiber felt | 38 | 1.73 | 1.23 | 0.086 | 0.0110 | 36,200 |
| C | Brucite fiber paper | 47 | 1.56 | 1.39 | 0.102 | 0.0113 | 35,400 |
| D | Carbon cloth | 41 | 1.39 | 1.63 | 0.189 | 0.0118 | 33,900 |
| E | Graphite cloth | 41 | 1.35 | 2.25 | 0.207 | 0.0158 | 25,300 |

The most pronounced and significant area of thermal insulating applications wherein the uniquely composite insulating attributes of fibrous brucite are of generally unsurpassed superiority is that of ablative type thermosetting resinous bodies for aggressive transient thermal conditions. Such insulations normally constitute phenolic or other high temperature resistant thermosetting resin bodies reinforced with a fibrous material which may be a random dispersion of discrete fibers, loose felt, paper or macerated paper, cloth, scrim, etc. In many cases the fibrous material typically of necessity consists of costly and exotic products such as a silica fiber produced either directly from very high temperature quartz melts or by involved leaching the metal oxides from a glass fiber, zirconia, potassium titanate, graphite or carbon, or products embodying the same, whereas more common materials such as asbestos have been found generally wanting in these more demanding applications.

In addition to certain of the foregoing examples demonstrating the superiority of the fibrous brucite in this important and very stingent area, the following examples and data further establish the merit and improved attributes of the fibrous brucite in such insulations.

A series of different fibrous reinforcements for resin impregnated and laminated ablative insulating bodies were subjected to high temperature evaluation tests with an 80 KW plasma arc unit to determine their relative properties in an ablative type insulation under aggressive thermal conditions. The average test conditions for each evaluation were:

Heat flux _____ B.t.u./ft.$^2$-sec__  400
Gas enthalpy _____ B.t.u./lb____ 3312
Flame temperature _____ ° F__ 6725
Test distance _____ inch__ 1⅛
Test angle _____ deg__ 45
Gas velocity _____ ft./sec__ 1304
Test atmosphere:
   Nitrogen _____ percent__ 80
   Oxygen _____ do____ 20

The test samples respectively comprised: shredded brucite paper, leached silica fiber fabric, carbon fabric, graphite fabric, each impregnated and molded with about 35 to 40% by weight thereof of high temperature phenolic resin. Following a 90 second duration exposure to the foregoing given conditions the laminated molded panel samples comprising silica fabric and brucite fiber exhibited similar erosion rates of 0.29 mils per sec., but their depth of char in the silica cloth was 0.270 inches compared to 0.194 inch char depth for the brucite material. The brucite molded panel was also markedly superior to the carbon fabric and graphite fabric reinforced bodies in both erosion rate, determined at 1.94 and 2.59 respectively, char depth of 0.250 and 0.330 respectively, and all other properties measured under like conditions.

A further similar test to evaluate and compare brucite fiber reinforced products of this invention in an all nitrogen atmosphere in relation to leached silica, carbon and graphite fibrous reinforced materials comprised the following test conditions:

Heat flux _____ B.t.u./ft.$^2$-sec__ 1000±100
Test angle _____ deg__ 45
Test atmosphere _____ percent N$_2$__ 100
Test duration _____ seconds__ 90
Test distance _____ inch__ 1
Gas velocity (0.375 I.D. nozzle) _____ s.c.f.h__ 150

The similar reinforced laminates of about 35 to 40% resin content comprised either graphite fabric, carbon fabric, silica fabric or brucite fiber and when compared under the foregoing test conditions, the brucite and graphite fabric containing samples exhibited the lowest erosion rate of 0.41 mil per second, and an 85% brucite fiber and 15% asbestos fiber composite sample was second with an erosion rate of 0.76 mil per second as compared to 0.95 mil per second for a similar graphite fiber reinforced sample, 1.21 mil per second for a similar carbon fiber reinforced sample and 1.58 mils per second for a similar silica fiber reinforced sample.

Additional ablation tests comprising reinforced plastic samples of approximately 40% by weight of phenolic resin (Monsanto's SC 1008) reinforced respectively with brucite fiber in various forms and comparative reinforcements of carbon, graphite and silica fabrics were carried out with the 80 k.w. plasma arc generator. The relative properties under comparable test conditions for each of the identified reinforced samples are set forth below in the following table:

TABLE V.—SUMMARY OF ABLATION DATA FOR REINFORCED PHENOLIC SAMPLES
[90-sec. exposure at 400 B.t.u./ft.$^2$-sec. heat flux]

| Reinforcement | Specific gravity | Erosion rate | | Percent weight loss | Mass ablation rate, lb./ft.$^2$ sec. | Total char erosion depth, in. | Thickness of mat'l remaining,[1] inches | Back face temp. rise, ° F. |
| --- | --- | --- | --- | --- | --- | --- | --- | --- |
| | | Mil/sec. | Gm/sec. | | | | | |
| TX fiber molding compound (random) | 1.76 | 0.70 | 0.094 | 13.8 | 0.0057 | 0.172 | 0.342 | 18 |
| TX fiber mat | 1.81 | 0.84 | 0.085 | 11.9 | 0.0079 | 0.154 | 0.340 | 30 |
| TX molding compound (fiber orientation) | 1.81 | 0.29 | 0.107 | 16.0 | 0.00273 | 0.215 | 0.316 | 95 |
| TX fiber thin sheet | 1.62 | 0.99 | 0.123 | 12.7 | 0.0084 | 0.229 | 0.262 | 68 |
| Silica fabric | 1.64 | 0.13 | 0.037 | 6.3 | 0.0019 | 0.277 | 0.230 | 76 |
| Asbestos mat | 1.55 | 4.19 | 0.198 | 30.5 | 0.0342 | 0.423 | 0.073 | 85 |
| Asbestos thin sheet | 1.64 | 4.89 | 0.223 | 35.2 | 0.0383 | 0.470 | 0.043 | 66 |
| Carbon fabric | 1.39 | 2.26 | 0.210 | 39.3 | 0.0132 | 0.515 | 0.016 | ([2]) |
| Graphite fabric | 1.35 | 2.64 | 0.197 | 38.6 | 0.0156 | 0.521 | 0 | 510 |

[1] Original specimen thickness—(Total char and erosion depth).
[2] Malfunction of thermocouple.

The erosion rates were based on the material lost during exposure and the mils per second erosion rate was calculated as the loss in thickness measured from the back face of the sample to the lowest point of erosion. Reinforcements in Table V are listed in the order of thickness for remaining substrate. This thickness figure was determined by subtracting the erosion loss and char depth from the original thickness of the sample.

As the data in Table V indicates, resin samples made with brucite reinforcements retain more original material at this set of test conditions than other commercial reinforcements. Accordingly an obvious result of this type of reinforcement is the probability of reducing the thickness of insulating materials through the utilization of brucite reinforcement which could result in a substantial gain in the weight penalty now encountered because of minimum material requirements to attain sufficient insulating protection with the commercially available reinforcements. This test additionally establishes the composite characteristics of low erosion rate, resistance of char and to high temperatures, and good insulating properties of the brucite reinforcement in both mat and thin sheet form compared with the other reinforcing materials. Under the given set of conditions brucite in the form of a molding compound and mat retained 0.342 and 0.340 inch of the original half inch thick samples respectively compared with only 0.016 inch for carbon, none for graphite, 0.230 inch for silica and about 0.043 to 0.073 inch for typical asbestos phenolic compositions.

In Government sponsored tests comparing several fibrous reinforcing materials in phenolic moldings to evaluate their relative durability in rocket engines wherein the tests comprise subscale rocket engine firings to compare molded materials for ablatively cooled thrust chambers for space use, fibrous brucite in a phenolic resin composition was found and reported to be the most suitable combustion chamber material due to its outstanding resistance to char. These tests were also conducted with silica fiber phenolic resin composites as well as many other apt insulating materials.

The most significant and unexpected aspect of fibrous brucite is primarily that this known and available natural mineral, and thus more or less economical material, is replete with such a variety and combination of decidedly useful and advantageous physical and chemical properties and characteristics which contribute to a broad and substantially comprhensive area of thermal insulating requirements and thereby presents overall or composite superior thermal insulating properties. In particular, notwithstanding the possible superiority of other materials in a specific given area or areas or in limited applications, the composite of properties comprising effective low thermal conductivity, high specific heat, thermal dehydration entailing the consumption of high amounts of thermal energy and in turn conversion to magnesium oxide having a melting point in the order of about 5,000° F., superior diffusivity, high thermal stability and resistance to thermal embrittlement over extended elevated temperature ranges, ready fabrication into substantially any conventional form, shape or product, high resin absorption or retention absorption capacity, superior ablative properties providing a low erosion rate and minimal char rate, among many other advantageous and distinctive characteristics of brucite provides a composite of attributes constituting, considering all factors or the total of thermal insulating conditions, a universally superior and versatile thermal insulating material, or component therefor, which considering its costs constitutes a decided contribution to the art.

As indicated hereinbefore, fibrous brucite can be rendered or fabricated into insulating products or constructions of substantially any common or known category employing a fibrous component, including low density masses of loose or bonded fiber as in conventional felts or mats; consolidated felted bodies of fiber comprising relatively dense felts, papers, board, and the like articles; carded, twisted, spun, etc. fibers comprising rovings or yarn applied as such, or woven or by other textile measures converted to cloth or fabric; fibers admixed, impregnated or saturated with a resin or other solidifiable liquids; fillers and/or reinforcement in insulations or constructions; and they can be so utilized either alone or in combination with other fibrous materials. Effective binders for use in such products or constructions comprise organic resins both thermosetting and thermoplastic, rubbers, adhesives and glues, and inorganic bonding materials including low temperature fusing glasses or enamels, phosphates, sodium silicate, colloidal aluminum or silica, etc., with the type and amount thereof conforming to the requirements of the particular product. Radiation opacifying materials and other insulating expedients can of course also be combined with or employed in conjunction with the insulation of this invention.

A prime application of brucite fibers is in the production of moldable, ablative thermal insulations comprising laminations of resin impregnated or saturated fibrous bodies, and such resin containing fibrous masses masticated or comminuted into pliant, moldable condition. The brucite fibers may contain or be combined with whatever amounts of resin which can be retained including quantities ranging as great as about 5 to 75% by weight of the paper and more typically about 35 to 55% by weight of the paper. Molding compounds comprising masticated or comminuted fibrous masses, paper, or other sources of fiber, may comprise about 5 to 95% by weight of fiber and about 95 to 5% by weight of resin and preferably about 45 to 65% of fiber to about 55 to 35% of resin.

The latent unique and advantageous properties of fibrous brucite, a number of which have been demonstrated above, render this material particularly effective in a variety of applications and its good adaptability to fabrication further contributes to its utility. Moreover, the cost of the fibrous brucite including its refinement or processing is relatively low and comprises only a small fraction of the high costs of many current fibrous materials of unusual properties which can be replaced by apt forms of the fibrous brucite material without loss of performance.

As employed throughout the appended claims the terms "fibrous brucite" and/or "brucite fiber" are to be understood as designating, and to define and include fibers substantially consisting of magnesium oxide either in the hydrous form —$Mg(OH)_2$— or anhydrous form —$MgO$— and in all degrees or stages of dehydration or hydration intermediate thereof which consist of and/or are derived or result from the fibrous form of the natural mineral brucite, and in particular any thermal dehydration products of the fibrous form of the natural mineral brucite.

It is to be understood that the foregoing details are given for the purpose of illustration and not restriction and that variations within the spirit of the invention are to be included within the scope of the appended claims.

What I claim is:

1. The method of insulating thermal energy and inhibiting its transmission, including steady state and transient thermal conditions, consisting of the application of an ablative thermal insulation of a body consisting essentially of an admixture of fibrous brucite and thermosetting resin.

2. The method of insulating thermal energy and inhibiting transmission of claim 1, including transient thermal conditions, wherein the application of an ablative thermal insulation inhibiting transfer of thermal energy consists of a body consisting essentially of approximately 5 to 75% by weight thereof of fibrous brucite consisting essentially of magnesium hydroxide and approximately 5 to 75% by weight of thermosetting resin.

3. A thermal insulation for transient thermal insulation conditions consisting of a body consisting essentially of approximately 5 to 95% by weight of fibrous brucite consisting essentially of magnesium hydroxide and approximately 5 to 95% by weight of thermosetting resin.

4. The thermal insulation of claim 3 for transient thermal insulation conditions wherein the body consists essentially of approximately 45 to 65% by weight of fibrous brucite consisting essentially of magnesium hydroxide and approximately 55 to 35% by weight of thermosetting resin.

5. The thermal insulation of claim 3 for transient thermal insulating conditions wherein the thermal insulation consists essentially of approximately 45 to 65% by weight of fibrous brucite and approximately 55 to 35% by weight of thermosetting phenolic resin.

References Cited

UNITED STATES PATENTS

| | | | |
|---|---|---|---|
| 2,732,295 | 1/1956 | Hollenberg | 162—152 X |
| 2,962,414 | 11/1960 | Arledter | 162—145 |
| 3,014,835 | 12/1961 | Feigley | 162—155 X |

HOWARD R. CAINE, Primary Examiner.

U.S. Cl. X.R.

106—242; 162—155

UNITED STATES PATENT OFFICE
CERTIFICATE OF CORRECTION

Patent No. 3,432,381  March 11, 1969

John Oliver Collins, Jr.

It is certified that error appears in the above identified patent and that said Letters Patent are hereby corrected as shown below:

Column 1, line 33, "insulsating" should read -- insulating --; line 39, "expandable" should read -- expendable --. Column 2, line 7, "discernable" should read -- discernible --; line 49, "compostions" should read -- compositions --; line 61, "Mg(OH)" should read -- $Mg(OH)_2$ --. Column 4, line 69, "produces" should read -- produced --. Column 6, line 62, "plasms" should read -- plasma --. Column 7, line 41, "2.72" should read -- 2.73 --; Table II, heading to the eleventh column, "Mass Abalt. Rate" should read -- Mass Ablat. Rate --. Column 9, line 21, "stingent" should read -- stringent --. Column 11, line 18, "comprhensive" should read -- comprehensive --.

(SEAL)  Signed and sealed this 28th day of April 1970.

Attest:

Edward M. Fletcher, Jr.  WILLIAM E. SCHUYLER, JR.
Attesting Officer  Commissioner of Patents